United States Patent
Heeke

(10) Patent No.: US 8,201,675 B2
(45) Date of Patent: Jun. 19, 2012

(54) TORQUE CONVERTER REVERSE CLUTCH SYSTEM AND METHOD OF OPERATING A REVERSE CLUTCH SYSTEM

(75) Inventor: Gregory Heeke, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 581 days.

(21) Appl. No.: 12/380,620

(22) Filed: Mar. 2, 2009

(65) Prior Publication Data
US 2009/0229937 A1   Sep. 17, 2009

Related U.S. Application Data

(60) Provisional application No. 61/069,503, filed on Mar. 14, 2008.

(51) Int. Cl.
*F16H 45/00* (2006.01)
*F16H 45/02* (2006.01)

(52) U.S. Cl. ............... 192/3.22; 192/3.25; 192/3.27; 192/3.29

(58) Field of Classification Search ............ 192/3.22, 192/3.25, 3.27, 3.3; 60/331, 333, 345, 346
See application file for complete search history.

(56) References Cited

U.S. PATENT DOCUMENTS

| 4,869,128 A | * | 9/1989 | Ohkubo | 192/3.24 |
| 5,669,475 A | * | 9/1997 | Matsuoka | 192/3.3 |
| 6,050,375 A | | 4/2000 | Gradu et al. | |
| 6,409,001 B1 | | 6/2002 | Kerr | |
| 6,974,048 B2 | | 12/2005 | Funk | |

* cited by examiner

*Primary Examiner* — David D Le
*Assistant Examiner* — Jacob S Scott
(74) *Attorney, Agent, or Firm* — Simpson & Simpson, PLLC

(57) ABSTRACT

A torque converter including a clutch assembly and a channel. The clutch assembly includes: a reverse clutch with a piston plate, the reverse clutch controllably connecting a reverse stator and a drive hub; a forward clutch including the piston plate, the forward clutch controllably connecting a turbine and the drive hub; and a cavity partially formed by the piston plate. The channel supplies fluid to the cavity and to vent fluid from the cavity and the piston plate is displaceable in response to fluid pressure in the cavity to control operation of the reverse and forward clutches. In a preferred embodiment, forces associated with operation of the reverse and forward clutches are balanced within the clutch assembly. The torque converter also includes a clutch rotationally connected to a turbine and a ground and a one-way clutch rotationally connected to a forward stator and the ground.

27 Claims, 4 Drawing Sheets

TORQUE CONVERTER REVERSE CLUTCH SYSTEM AND METHOD OF OPERATING A REVERSE CLUTCH SYSTEM

CROSS-REFERENCE TO RELATED APPLICATIONS

This application claims the benefit under 35 U.S.C. §119 (e) of U.S. Provisional Application No. 61/069,503 filed on Mar. 14, 2008 which application is incorporated herein by reference.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a clutch assembly for a torque converter having forward and reverse stators, the assembly operable using a single fluid passage. Further, the invention relates to a clutch assembly that is balanced.

BACKGROUND OF THE INVENTION

U.S. Pat. No. 6,974,048 discloses a torque converter with dual clutches operated by a common piston. Unfortunately, this patent refers to clutches that control torque between a front cover and a pump or bypass clutch, which is not applicable to clutches for operating a torque converter having forward and reverse stator and a turbine. Also unfortunately, the clutches are balanced in an application where the piston is not mounted in the front cover; thus high axial forces would have to be resolved. Further, this system uses a spring applied clutch, which would not function well in a clutch system for a converter with forward and reverse stators. For example, on start up one clutch would be applied and start pulling. With the spring applied system it would be difficult to control a neutral state in with neither clutch is applied. Specifically, the control oil pressure cavity 12 would have to offset partial spring force as well as changing charge pressure.

Unfortunately, oil pressure must be the highest in converter bypass mode because pressure in the clutch chamber must overcome charge pressure-before the clutch can start transmitting torque. Then, the effective clutch pressure is the difference between charge and clutch apply pressure. This high pressure must be present in converter bypass mode at highway speeds and would adversely affect gas mileage.

Unfortunately, there is no torque interrupt state in the patent. Clutch "PK" is applied first, then sequentially clutch "WK" is applied, which is desirable for the application described in the patent as it would not be desirable to have a torque interrupt when applying the by-pass clutch.

Thus, there is a long-felt need for balanced clutch assembly for a torque converter with forward and reverse stators having minimal axial space requirements and a simplified fluid control system.

BRIEF SUMMARY OF THE INVENTION

The present invention broadly comprises a torque converter, including a clutch assembly and a channel. The clutch assembly includes: a reverse clutch with a piston plate, the reverse clutch controllably connecting a reverse stator and a drive hub; a forward clutch including the piston plate, the forward clutch controllably connecting a turbine and the drive hub; and a cavity partially formed by the piston plate. The channel supplies fluid to the cavity and to vent fluid from the cavity and the piston plate is displaceable in response to fluid pressure in the cavity to control operation of the reverse and forward clutches. In a preferred embodiment, forces associated with operation of the reverse and forward clutches are balanced within the clutch assembly.

In a first embodiment, the torque converter includes a torus and for a first force on the piston plate due to fluid pressure in the cavity substantially equal to a second force on the piston plate due to fluid pressure in the torus, the piston plate is displaceable such that both the forward clutch and the reverse clutch are disengaged. The torque converter also includes: a clutch rotationally connected to a turbine in the torus and a ground and in fluid communication with the cavity and the torus; and a one-way clutch rotationally connected to a forward stator and the ground and in fluid communication with the cavity and the torus. The clutch and the one-way clutch are displaceable such that the clutch is disengaged to enable rotation of the turbine, the one-way clutch is engaged or disengaged, and the reverse stator is rotatable in a reverse direction and in a forward direction, opposite the reverse direction. In one embodiment, the clutch and the one-way clutch are respective slipper clutches. In another embodiment, the clutch and the one-way clutch are respective friction clutches.

In a second embodiment, the torque converter includes a torus and for a first force on the piston plate due to fluid pressure in the cavity less than a second force on the piston plate due to fluid pressure in the torus, the piston plate is displaceable in an axial direction to engage the forward clutch and disengage the reverse clutch. The torque converter also includes: a clutch rotationally connected to a turbine in the torus and a ground and in fluid communication with the cavity and the torus; and a one-way clutch rotationally connected to a forward stator and the ground and in fluid communication with the cavity and the torus. The clutch and the one-way clutch are displaceable such that the clutch is disengaged to enable rotation of the turbine, the one-way clutch is engaged to rotationally lock the forward stator in a reverse direction, and the reverse stator is rotatable in a reverse direction and in a forward direction, opposite the reverse direction. In one embodiment, the clutch and the one-way clutch are respective slipper clutches. In another embodiment, the clutch and the one-way clutch are respective friction clutches.

In a third embodiment, the torque converter includes a torus and for a first force on the piston plate due to fluid pressure in the cavity greater than a second force on the piston plate due to fluid pressure in the torus, the piston plate is displaceable in an axial direction to disengage the forward clutch and engage the reverse clutch. The torque converter also includes: a clutch rotationally connected to a turbine in the torus and a ground and in fluid communication with the cavity and the torus; and a one-way clutch rotationally connected to a forward stator and the ground and in fluid communication with the cavity and the torus. The clutch and the one-way clutch are displaceable such that the clutch is disengaged to enable rotation of the turbine, the one-way clutch is engaged to rotationally lock the forward stator in a reverse direction, and the reverse stator is rotatable in a reverse direction and in a forward direction, opposite the reverse direction. In one embodiment, the clutch and the one-way clutch are respective slipper clutches. In another embodiment, the clutch and the one-way clutch are respective friction clutches.

In a fourth embodiment, the torque converter includes an impeller shell, a rear cover, and an impeller clutch operable to rotationally connect the impeller shell with the rear cover. In a fifth embodiment, the torque converter includes a front cover and a converter by-pass clutch operable to rotationally connect the front cover to the drive hub.

The present invention also includes a method of operating a torque converter. Although the method is presented as a sequence of steps for clarity, no order should be inferred from the sequence unless explicitly stated. A first step controls, with a single channel, fluid pressure in a cavity partially formed by a piston plate for a clutch assembly including a reverse clutch with the piston plate, the reverse clutch controllably connecting a reverse stator and a drive hub, and a forward clutch including the piston plate, the forward clutch controllably connecting a turbine and the drive hub. A second step displaces the piston plate in response to fluid pressure in the cavity to control operation of the reverse and forward clutches.

In a first embodiment, a third step balances force associated with operation of the reverse and forward clutches within the clutch assembly. In a further embodiment, the clutch assembly includes a plate connecting the clutch assembly to a hub and balancing force associated with operation of the reverse and forward clutches within the clutch assembly includes displacing one or both of the piston plate or the plate.

In a second embodiment, the torque converter includes a torus and a fourth pressurizes fluid in the torus to apply a first force on the piston plate and controlling fluid pressure in the cavity includes pressurizing the cavity to apply a second force on the piston plate substantially equal to the first force and displacing the piston plate includes displacing the piston plate such that both the forward clutch and the reverse clutch are disengaged. In one embodiment, the torque converter includes a clutch rotationally connected to a turbine in the torus and a ground and in fluid communication with the cavity and the torus and a one-way clutch rotationally connected to a forward stator and the ground and in fluid communication with the cavity and the torus. A fifth step displaces the clutch and the one-way clutch such that the clutch is disengaged to enable rotation of the turbine, the one-way clutch is engaged or disengaged, and the reverse stator is rotatable in a reverse direction and in a forward direction, opposite the reverse direction. In another embodiment, the clutch and the one-way clutch are respective slipper clutches In a further embodiment, the clutch is a first friction clutch and a sixth step controls grounding of the one-way clutch with a second friction clutch.

In a third embodiment, the torque converter includes a torus and a seventh step pressurizes fluid in the torus to apply a first force on the piston plate and controlling fluid pressure in the cavity includes pressuring the cavity to apply a second force on the piston plate less than the first force and displacing the piston plate includes displacing the piston plate to engage the forward clutch and disengage the reverse clutch. In one embodiment, the torque converter includes a clutch rotationally connected to a turbine in the torus and a ground and in fluid communication with the cavity and the torus and a one-way clutch rotationally connected to a forward stator and the ground and in fluid communication with the cavity and the torus. An eighth step displaces the clutch and the one-way clutch such that the clutch is disengaged to enable rotation of the turbine, the one-way clutch is engaged to rotationally lock the forward stator in a reverse direction, and the reverse stator is rotatable in a reverse direction and in a forward direction, opposite the reverse direction. In another embodiment, the clutch and the one-way clutch are respective slipper clutches. In a further embodiment, the clutch is a first friction clutch and a ninth step controls grounding of the one-way clutch with a second friction clutch.

In a fourth embodiment, the torque converter includes a torus and a seventh step pressurizes fluid in the torus to apply a first force on the piston plate and controlling fluid pressure in the cavity includes pressuring the cavity to apply a second force on the piston plate greater than the first force and displacing the piston plate includes displacing the piston plate to disengage the forward clutch and engage the reverse clutch. In one embodiment, the torque converter includes a clutch rotationally connected to a turbine in the torus and a ground and in fluid communication with the cavity and the torus and a one-way clutch rotationally connected to a forward stator and the ground and in fluid communication with the cavity and the torus. A tenth step displaces the clutch and the one-way clutch such that the clutch is disengaged to enable rotation of the turbine, the one-way clutch is engaged to rotationally lock the forward stator in a reverse direction, and the reverse stator is rotatable in a reverse direction and in a forward direction, opposite the reverse direction. In another embodiment, the clutch and the one-way clutch are respective slipper clutches. In a further embodiment, the clutch is a first friction clutch and an eleventh step controls grounding of the one-way clutch with a second friction clutch.

In a fifth embodiment, the torque converter includes an impeller shell, a rear cover, and an impeller clutch and a twelfth step operates the impeller clutch to rotationally connect or disconnect the impeller shell with the rear cover.

It is a general object of the present invention to provide a balanced clutch assembly for a torque converter with forward and reverse stators having minimal axial space requirements and a simplified fluid control system and to provide a method of operating a reverse clutch system.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1A:
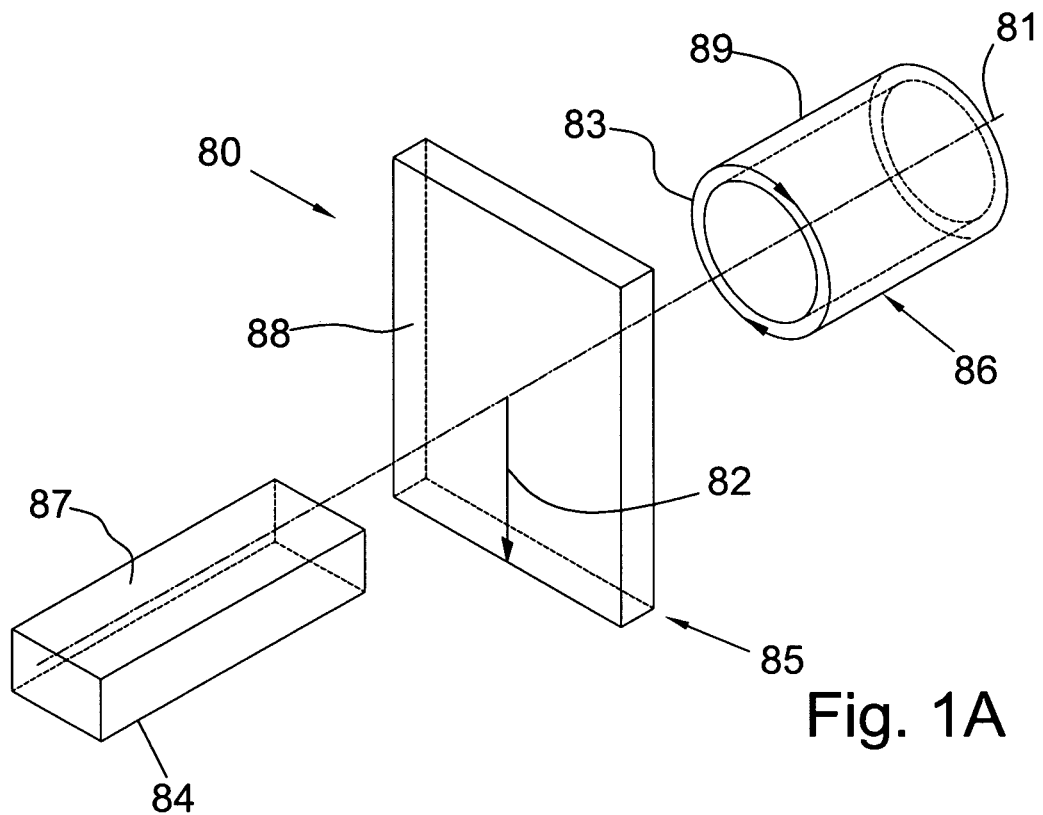
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
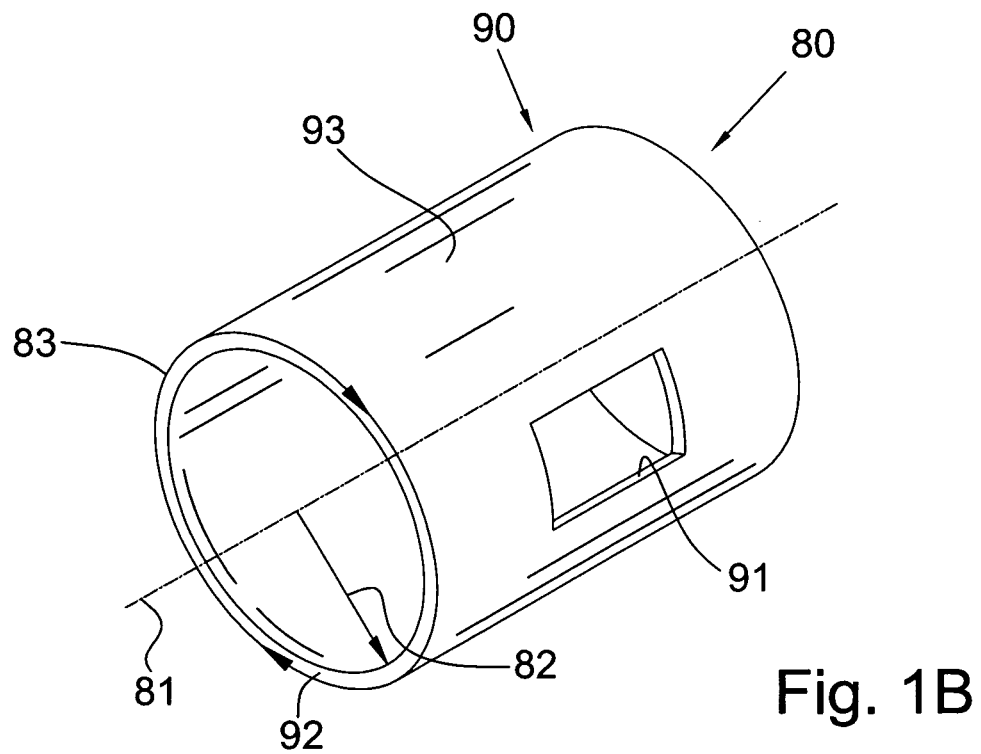
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
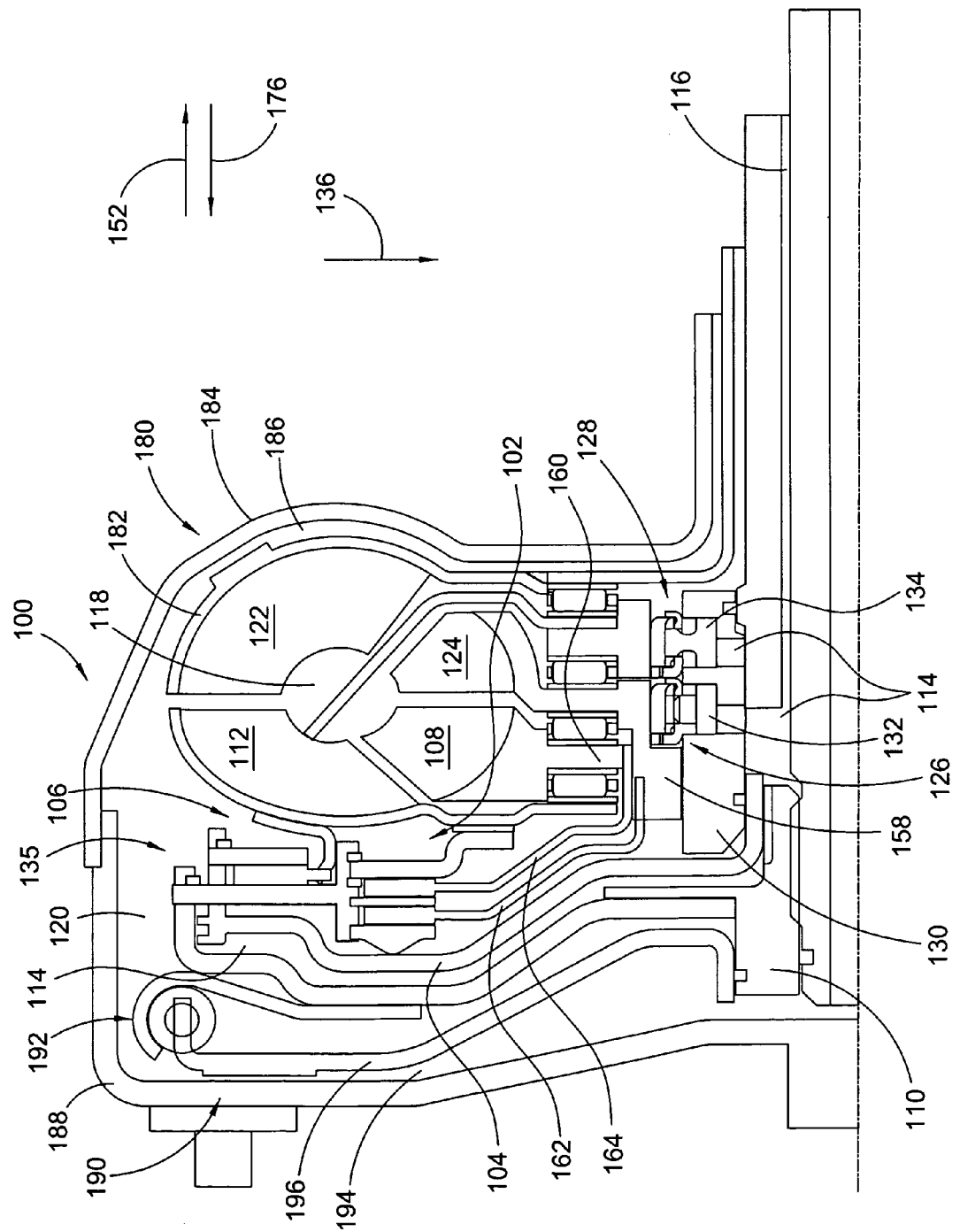
FIG. 2 is a partial cross-sectional view of a present invention torque converter.

FIG. 2 is a partial cross-sectional view of present invention torque converter 100. Torque converter 100 includes reverse clutch 102 with piston plate 104 and forward clutch 106, which also includes the piston plate. The reverse clutch controllably connects reverse stator 108 and drive hub 110. The forward clutch controllably connects turbine 112 and the drive hub. That is, by operating clutches 102 and 106, the reverse stator and the turbine, respectively, can be rotationally connected to or disconnected from the hub. By rotationally connected, or secured, we mean that components are connected such that the components rotate together, that is, the components are fixed with respect to rotation. Rotationally connecting components does not necessarily limit relative movement in other directions. For example, it is possible for components that are rotationally connected to have axial movement with respect to each other via a spline connection. However, it should be understood that rotational connection does not imply that movement in other directions is necessarily present. For example, components that are rotationally connected can be axially fixed one to the other. The preceding explanation of rotational connection is applicable to the discussions infra.

The torque converter also includes cavity, or chamber, 114 partially formed by the piston plate and channel 116 used to supply fluid to the cavity and to vent fluid from the cavity. That is, a single channel is used to control the fluid in the cavity and hence the fluid pressure in the cavity. The piston plate is displaceable in response to fluid pressure in the cavity to control operation of the reverse and forward clutches as further described infra.

The torque converter also includes torus 118, which forms a portion of chamber 120. The following is a broad description of the operation of clutches 102 and 106, a more detailed description is provided infra. Torque converter 100 operates in four modes: neutral mode, forward mode, reverse mode, and converter by-pass mode. To operate in neutral mode, the respective fluid pressures in chambers 114 and 120 are made substantially equal. That is, force on the piston plate due to fluid pressure in cavity 114 is substantially equal to force on the piston plate due to fluid pressure in the torus. In this case, the piston plate is displaceable such that both the forward clutch and the reverse clutch are disengaged and no torque passes through the forward or reverse clutches to the hub.

In forward and by-pass modes, fluid pressure in chamber 114 is reduced, for example to zero pressure and charge pressure fills chamber 120. That is, force on the piston plate due to fluid pressure in cavity 114 is less than force on the piston plate due to fluid pressure in the torus. In this case, the piston plate is displaceable such that the forward clutch is engaged and the reverse clutch is disengaged. In forward mode, torque is transmitted from the turbine through the forward clutch to the hub. By-pass mode is described infra.

In reverse mode, charge pressure fills chamber 120 and fluid pressure in chamber 114 is raised higher than the charge pressure. That is, force on the piston plate due to fluid pressure in cavity 114 is greater than force on the piston plate due to fluid pressure in the torus. In this case, the piston plate is displaceable such that the forward clutch is disengaged and the reverse clutch is engaged and torque is transmitted from stator 108 through the reverse clutch to the hub.

To enable operation in forward and reverse modes, torque converter 100 also includes pump 122 and forward stator 124. To control the operation of the turbine and the forward stator, the torque converter also includes clutches 126 and 128. In a preferred embodiment, clutch 126 is a one-way slipper clutch and clutch 128 is a slipper clutch. Clutch 126 is connected to the forward stator and a ground point for the torque converter, for example, grounding hub 130. Clutch 128 is connected to the turbine and the grounding hub. Clutches 126 and 128 also are each in fluid communication with chamber 114 and 120.

In neutral mode, the respective fluid pressures in chambers 114 and 120 are substantially equal. However, in neutral mode, torque is not transmitted through the turbine; therefore, torque is not transmitted from the turbine or the stators.

In forward and by-pass modes, fluid pressure in chamber 114 is reduced, for example to zero pressure and charge pressure fills chamber 120. The charge pressure in chamber 120 holds keys 132 and 134 for clutches 126 and 128, respectively, radially inward, disengaging clutch 128 and engaging clutch 126. This configuration enables the turbine to rotate freely and grounds clutch 126, holding the forward stator from rotation in the reverse direction. The reverse stator is free to rotate in either direction. In forward mode, torque is transmitted from the turbine through clutch 106 to hub 110. By-pass mode is described infra.

In reverse mode, charge pressure fills chamber 120 and fluid pressure in chamber 114 is raised higher than the charge pressure. The charge pressure in chamber 114 holds keys 132 and 134 for clutches 126 and 128, respectively, radially outward, disengaging clutch 126 and engaging clutch 128. This configuration rotationally locks the turbine. The forward stator is free to rotate in either direction. Thus, the turbine acts as a stator and the forward stator acts as a turbine. The reverse stator is free to rotate in either direction. Torque is transmitted from the forward and reverse stators through clutch 102 to hub 110.

Figure 3:
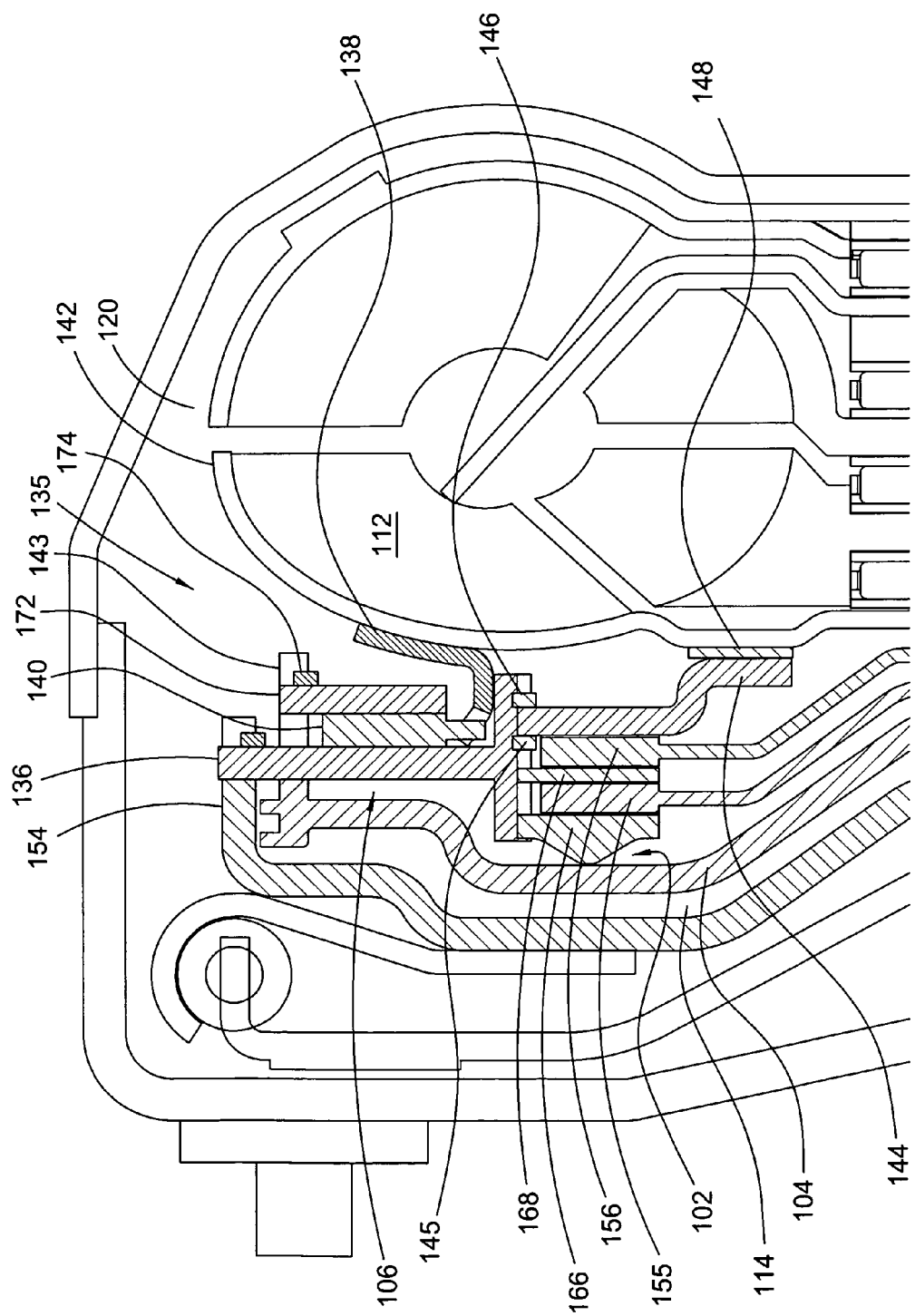
FIG. 3 is a detail of the clutch assembly shown in FIG. 2.

FIG. 3 is a detail of clutch assembly 135 shown in FIG. 2. The following should be viewed in light of FIGS. 2 and 3. Clutches 102 and 106 include drive clutch carrier 136. Clutch 106 includes plate 138 and clutch plate 140. Plate 138 is fixedly secured to turbine shell 142 by any means known in the art and rotationally connected to plate 140 by any means known in the art, for example by a spline, toothed, or other interlocking arrangement. Piston 104 is axially displaceable with respect to the drive carrier. For example, the piston includes axial segments 143 passing through respective openings in the carrier. Clutch 102 includes pressure plate 144 rotationally connected to carrier 136 by any means known in the art, for example by a spline, toothed, or other interlocking arrangement. Snaps rings 145 and 146 axially restrain plate 144 on one end with respect to the carrier and spacing element 148 axially restrains plate 144 in direction 152 via contact with the turbine shell. Plate 154 is rotationally connected to carrier 136 and hub 110 by any means known in the art, for example, by respective spline, toothed, or other interlocking arrangements.

Clutch 102 includes clutch plates 155 and 156, rotationally connected to hubs 158 and 160, respectively, by tangs 162 and 164, respectively. Hub 158 is for the forward stator and hub 160 is for the reverse stator. In reverse mode, pressure in chamber 114 displaces piston 104 in direction 152. Piston 104 contacts apply plate 166 and displaces the apply plate in direction 152, bringing the apply plate, clutch plates 155 and 156, drive plate 168 (rotationally connected to the drive carrier), and the backing plate into engaging contact. As noted supra, the plate 144 is axially fixed in direction 152 and reacts the force from the apply plate. Clutch 132 is disengaged, therefore torque flows from the stators through the tangs and clutch plates to the drive carrier. The drive carrier transmits the torque to hub 110 through plate 154. Clutch 102 also includes friction material disposed on or between the apply plate, the clutch plates, the drive plate, and the pressure plate.

Clutch 106 includes pressure plate 172 axially fixed with respect to the piston in direction 152 by snap ring 174. The carrier is axially fixed with respect to plate 154 by the rotational connection between the carrier and the plate. In forward mode, pressure in chamber 120 displaces piston 104 in direction 176. As the piston displaces in direction 176, snap ring 174 engages the pressure plate, displacing the pressure plate in direction 176 and bringing the pressure plate, plate 140 and the drive carrier into engagement, that is, engaging clutch 106. Torque from the turbine is transmitted by plates 138, 140, and 172 to the drive carrier. The drive carrier transmits the torque to hub 110 through plate 154. Clutch 106 also includes friction material disposed on or between the drive carrier and plates 138, 140, and 172.

Advantageously, axial forces generated by the operation of clutch assembly 135 are balanced; that is, the forces are substantially contained within the assembly and are not transmitted to components outside the assembly. Alternately stated, the clutch assembly does not react forces, associated with the operation of the clutch assembly, with components outside the assembly. For example, the forces on plates 104 and 154, associated with engaging clutch 106 are substantially balanced within assembly 135.

Returning to FIG. 2, in a preferred embodiment, torque converter 100 also includes impeller clutch 180 arranged to rotationally connect impeller shell 182 and rear cover 184. In neutral mode, charge pressure fills chamber 120 and fluid pressure in chamber 186 is greater than the charge pressure. That is, force on the impeller shell due to fluid pressure in cavity 186 is greater than force on the shell due to fluid pressure in chamber 120. This pressure differential causes torus 118 to displace in direction 176, opening the impeller clutch. Thus, torque from cover 188 is not transmitted to the impeller. Removing torque from the impeller facilitates operation of the slipper clutches.

In forward, reverse, and converter by-pass modes, charge pressure fills chamber 120 and fluid pressure in chamber 186 is less than the charge pressure. That is, force on the impeller shell due to fluid pressure in cavity 186 is less than force on the shell due to fluid pressure in chamber 120. This pressure differential causes torus 118 to displace in direction 152, closing the impeller clutch. Thus, torque from cover 188 is transmitted to the impeller.

In another preferred embodiment, torque converter 100 also includes converter by-pass clutch 190 arranged to rotationally connect front cover 188 and hub 110 through damper 192 and plate 154. In neutral, forward, and reverse modes, charge pressure fills chamber 120 and fluid pressure in chamber 194 is greater than the charge pressure, displacing piston 196 in direction 152, opening the by-pass clutch. That is, force on the piston plate due to fluid pressure in cavity 194 is greater than force on piston plate 196 due to fluid pressure in chamber 120. Thus, torque from cover 188 is not transmitted through clutch 190.

In converter by-pass modes, charge pressure fills chamber 120 and fluid pressure in chamber 194 is less than the charge pressure. That is, force on the piston plate due to fluid pressure in cavity 194 is less than force on the piston plate due to fluid pressure in chamber 120. This pressure differential causes piston 196 to displace in direction 176, closing the by-pass clutch and transmitting torque from cover 188 to hub 110 through damper 192 and plate 154.

Figure 4:
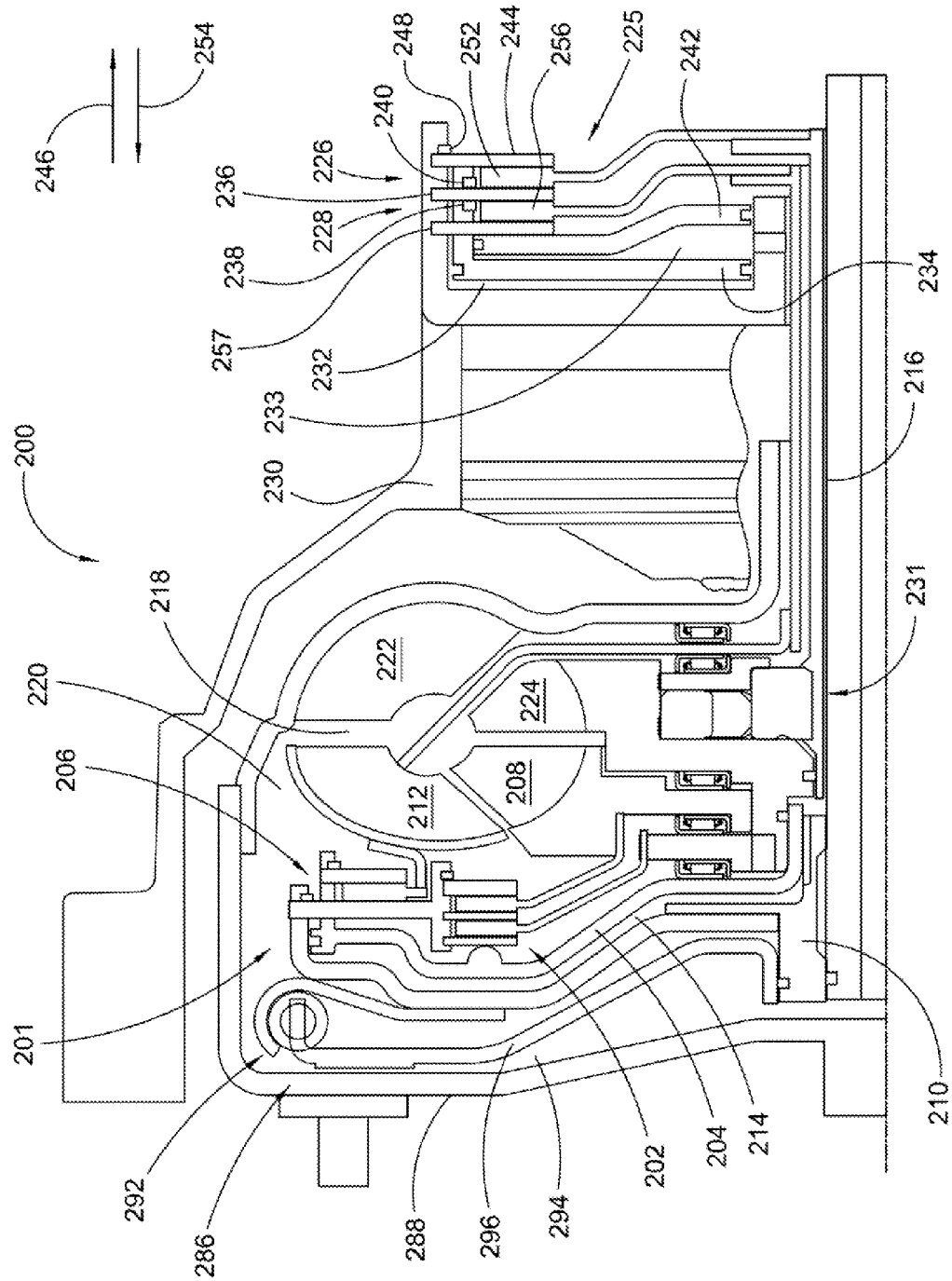
FIG. 4 is a partial cross-sectional view of a present invention torque converter.

FIG. 4 is a partial cross-sectional view of present invention torque converter 200. Torque converter 200 includes clutch assembly 201. The clutch assembly includes reverse clutch 202 with piston plate 204 and forward clutch 206, which also includes the piston plate. The discussions for clutch assembly 135 and clutches 102 and 106 in the respective descriptions of FIGS. 2 and 3 are applicable to clutch assembly 201 and clutches 202 and 206. The reverse clutch controllably connects reverse stator 208 and forward stator 224 to drive hub 210. The forward clutch controllably connects turbine 212 and the drive hub. That is, by operating clutches 202 and 206, the stators and the turbine, respectively, can be rotationally connected to or disconnected from the hub.

The torque converter also includes cavity, or chamber, 214 partially formed by the piston plate and channel 216 used to supply fluid to the cavity and to vent fluid from the cavity. That is, a single channel is used to control the fluid in the cavity and hence the fluid pressure in the cavity. The piston plate is displaceable in response to fluid pressure in the cavity to control operation of the reverse and forward clutches as described for piston 104, clutch assembly 135, and clutches 102 and 106 in FIGS. 2 and 3.

The torque converter also includes torus 218, which forms a portion of chamber 220. The discussion of the operation for clutches 102 and 106 in the description for FIGS. 2 and 3 is applicable to clutches 202 and 206, and in the interest of brevity is not repeated.

To enable operation in forward and reverse modes, torque converter 200 also includes pump 222 and forward stator 224. To control the operation of the turbine and the stators, the torque converter also includes clutch assembly 225 with clutches 226 and 228. In a preferred embodiment, clutches 226 and 228 are friction clutches. Clutch 226 is rotationally connected to the forward stator and a ground point, for example, case 230. Specifically, clutch 226 is connected to one-way clutch 231 for stator 224. Thus, clutch 226 provides grounding for clutch 231 when engaged. Clutch 228 is rotationally connected to the turbine and the case. Chambers 232 and 233 are used to control clutches 226 and 228 as described infra. Assembly 225 includes plate 234 axially connected to plate 236 by snap rings 238 and 240. The assembly also includes plates 242 and 244. Plate 244 is retained in axial direction 246 by snap ring 248.

In neutral mode, the respective fluid pressures in chambers 232 and 233 are substantially equal. However, in neutral mode, torque is not transmitted through the turbine; therefore, torque is not transmitted from the turbine or the stators.

In forward mode and torque converter by-pass mode, fluid pressure in chamber 232 is greater than the pressure in chamber 233. The pressure in chamber 232 displaces plate 234 in direction 246, causing plate 236 to displace in direction 246 also. Plate 236 engages clutch plate 252 with plate 244, engaging clutch 226. Clutch 228 is unengaged. The turbine and stator 208 are free to rotate. Clutch 226 grounds clutch 231 and clutch 231 operates as a standard one-way clutch, for example, preventing rotation in a reverse direction. In forward mode, torque is transmitted from the turbine through clutch 206 to hub 210. By-pass mode is described infra.

In reverse mode, pressure in chamber 233 is greater than pressure in chamber 232, causing plate 234 to displace in direction 254 and plate 242 to displace in direction 246. The displacement of plate 234 causes plate 236 to also displace in direction 254 and engage clutch plate 256. The displacement of plate 242 causes the plate to drive plate 257. Thus, clutch 228 is engaged and clutch 226 is disengaged. This configuration rotationally locks the turbine. The one-way clutch is ungrounded; therefore, the forward stator is free to rotate in either direction. Thus, the turbine acts as a stator and the forward stator acts as a turbine. The reverse stator is free to rotate in either direction. Torque is transmitted from the stators through clutch 202 to hub 210.

Drive plates 236 and 257 and backing plate 244 are rotationally connected to the case by any means known in the art, for example, by respective spline, toothed, or other interlocking arrangements.

In another preferred embodiment, torque converter 200 also includes converter by-pass clutch 286 arranged to rotationally connect front cover 288 and hub 210 through damper 292 and plate 296. In neutral, forward, and reverse modes, charge pressure fills chamber 220 and fluid pressure in chamber 294 is greater than the charge pressure, displacing piston 296 in direction 246, opening the by-pass clutch. That is, force on the piston plate due to fluid pressure in cavity 294 is greater than force on piston plate 296 due to fluid pressure in chamber 220. Thus, torque from cover 288 is not transmitted through clutch 286.

In converter by-pass modes, charge pressure fills chamber 220 and fluid pressure in chamber 294 is less than the charge pressure. That is, force on the piston plate due to fluid pressure in cavity 294 is less than force on the piston plate due to fluid pressure in chamber 220. This pressure differential causes piston 296 to displace in direction 254, closing the by-pass clutch and transmitting torque from cover 288 to hub 210 through damper 292 and plate 296.

The present invention also includes a method of operating a torque converter. Although the method is presented as a sequence of steps for clarity, no order should be inferred from the sequence unless explicitly stated. A first step controls, with a single channel, fluid pressure in a cavity partially formed by a piston plate for a clutch assembly including a reverse clutch with the piston plate, the reverse clutch controllably connecting a reverse stator and a drive hub, and a forward clutch including the piston plate, the forward clutch controllably connecting a turbine and the drive hub. A second step displaces the piston plate in response to fluid pressure in the cavity to control operation of the reverse and forward clutches.

In a first embodiment, a third step balances force associated with operation of the reverse and forward clutches within the clutch assembly. In a further embodiment, the clutch assembly includes a plate connecting the clutch assembly to a hub and balancing force associated with operation of the reverse and forward clutches within the clutch assembly includes displacing one or both of the piston plate or the plate.

In a second embodiment, the torque converter includes a torus and a fourth step pressurizes fluid in the torus to apply a first force on the piston plate and controlling fluid pressure in the cavity includes pressurizing the cavity to apply a second force on the piston plate substantially equal to the first force and displacing the piston plate includes displacing the piston plate such that both the forward clutch and the reverse clutch are disengaged. In one embodiment, the torque converter includes a clutch rotationally connected to a turbine in the torus and a ground and in fluid communication with the cavity and the torus and a one-way clutch rotationally connected to a forward stator and the ground and in fluid communication with the cavity and the torus. A fifth step displaces the clutch and the one-way clutch such that the clutch is disengaged to enable rotation of the turbine, the one-way clutch is engaged or disengaged, and the reverse stator is rotatable in a reverse direction and in a forward direction, opposite the reverse direction. In another embodiment, the clutch and the one-way clutch are respective slipper clutches. In a further embodiment, the clutch is a first friction clutch and a sixth step controls grounding of the one-way clutch with a second friction clutch.

In a third embodiment, the torque converter includes a torus and a seventh step pressurizes fluid in the torus to apply a first force on the piston plate and controlling fluid pressure in the cavity includes pressuring the cavity to apply a second force on the piston plate less than the first force and displacing the piston plate includes displacing the piston plate to engage the forward clutch and disengage the reverse clutch. In one embodiment, the torque converter includes a clutch rotationally connected to a turbine in the torus and a ground and in fluid communication with the cavity and the torus and a one-way clutch rotationally connected to a forward stator and the ground and in fluid communication with the cavity and the torus. An eighth step displaces the clutch and the one-way clutch such that the clutch is disengaged to enable rotation of the turbine, the one-way clutch is engaged to rotationally lock the forward stator in a reverse direction, and the reverse stator is rotatable in a reverse direction and in a forward direction, opposite the reverse direction. In another embodiment, the clutch and the one-way clutch are respective slipper clutches. In a further embodiment, the clutch is a first friction clutch and a ninth step controls grounding of the one-way clutch with a second friction clutch.

In a fourth embodiment, the torque converter includes a torus and a seventh step pressurizes fluid in the torus to apply a first force on the piston plate and controlling fluid pressure in the cavity includes pressuring the cavity to apply a second force on the piston plate greater than the first force and displacing the piston plate includes displacing the piston plate to disengage the forward clutch and engage the reverse clutch. In one embodiment, the torque converter includes a clutch rotationally connected to a turbine in the torus and a ground and in fluid communication with the cavity and the torus and a one-way clutch rotationally connected to a forward stator and the ground and in fluid communication with the cavity and the torus. A tenth step displaces the clutch and the one-way clutch such that the clutch is disengaged to enable rotation of the turbine, the one-way clutch is engaged to rotationally lock the forward stator in a reverse direction, and the reverse stator is rotatable in a reverse direction and in a forward direction, opposite the reverse direction. In another embodiment, the clutch and the one-way clutch are respective slipper clutches. In a further embodiment, the clutch is a first friction clutch and an eleventh step controls grounding of the one-way clutch with a second friction clutch.

In a fifth embodiment, the torque converter includes an impeller shell, a rear cover, and an impeller clutch and a twelfth step operates the impeller clutch to rotationally connect or disconnect the impeller shell with the rear cover.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

I claim:

1. A torque converter, comprising:
   a torus;
   a forward stator;
   a reverse stator separate from the forward stator and separately rotatable with respect to the forward stator;
   a clutch assembly including:
      a reverse clutch with a piston plate, the reverse clutch controllably connecting the reverse stator and a drive hub;
      a forward clutch including the piston plate, the forward clutch controllably connecting a turbine and the drive hub; and,
      a cavity partially formed by the piston plate; and,
   a channel to supply fluid to the cavity and to vent fluid from the cavity, wherein the piston plate is displaceable in response to fluid pressure in the cavity to control operation of the reverse and forward clutches and wherein for a first force on the piston plate due to fluid pressure in the cavity substantially equal to a second force on the piston plate due to fluid pressure in the torus, the piston plate is displaceable such that both the forward clutch and the reverse clutch are disengaged.

2. The torque converter of claim 1 wherein forces associated with operation of the reverse and forward clutches are balanced within the clutch assembly.

3. The torque converter of claim 1 further comprising:
   a clutch rotationally connected to a turbine in the torus and a ground and in fluid communication with the cavity and the torus; and,
   a one-way clutch rotationally connected to the forward stator and the ground and in fluid communication with the cavity and the torus, wherein the clutch and the one-way clutch are displaceable such that the clutch is disengaged to enable rotation of the turbine, the one-way clutch is engaged or disengaged, and the reverse stator is rotatable in a reverse direction and in a forward direction, opposite the reverse direction.

4. The torque converter of claim 1 wherein the clutch and the one-way clutch are respective slipper clutches.

5. The torque converter of claim 1 wherein the clutch is a first friction clutch and the one-way clutch is groundable by a second friction clutch.

6. The torque converter of claim 1 wherein for a first force on the piston plate due to fluid pressure in the cavity less than a second force on the piston plate due to fluid pressure in the torus, the piston plate is displaceable in an axial direction to engage the forward clutch and disengage the reverse clutch.

7. The torque converter of claim 6 further comprising:
   a clutch rotationally connected to a turbine in the torus and a ground and in fluid communication with the cavity and the torus; and,
   a one-way clutch rotationally connected to the forward stator and the ground and in fluid communication with the cavity and the torus, wherein the clutch and the one-way clutch are displaceable such that the clutch is disengaged to enable rotation of the turbine, the one-way clutch is engaged to rotationally lock the forward stator in a reverse direction, and the reverse stator is rotatable in a reverse direction and in a forward direction, opposite the reverse direction.

8. The torque converter of claim 6 wherein the clutch and the one-way clutch are respective slipper clutches.

9. The torque converter of claim 6 wherein the clutch is a first friction clutch and the one-way clutch is groundable by a second friction clutch.

10. The torque converter of claim 1 wherein for a first force on the piston plate due to fluid pressure in the cavity greater than a second force on the piston plate due to fluid pressure in the torus, the piston plate is displaceable in an axial direction to disengage the forward clutch and engage the reverse clutch.

11. The torque converter of claim 10 further comprising:
    a clutch rotationally connected to a turbine in the torus and a ground and in fluid communication with the cavity and the torus; and,
    a one-way clutch rotationally connected to the forward stator and the ground and in fluid communication with the cavity and the torus, wherein the clutch and the one-way clutch are displaceable such that the clutch is disengaged to enable rotation of the turbine, the one-way clutch is engaged to rotationally lock the forward stator in a reverse direction, and the reverse stator is rotatable in a reverse direction and in a forward direction, opposite the reverse direction.

12. The torque converter of claim 11 wherein the clutch and the one-way clutch are respective slipper clutches.

13. The torque converter of claim 11 wherein the clutch is a first friction clutch and the one-way clutch is groundable by a second friction clutch.

14. The torque converter of claim 1 further comprising an impeller shell, a rear cover, and an impeller clutch operable to rotationally connect the impeller shell with the rear cover.

15. The torque converter of claim 1 further comprising a front cover and a converter by-pass clutch operable to rotationally connect the front cover to the drive hub.

16. A method of operating a torque converter including a torus, a forward stator, and a reverse stator, separate from the forward stator, comprising the steps of:
- rotating the forward stator independently of the reverse stator;
- pressurizing fluid in the torus to apply a first force on the piston plate;
- controlling, through a single channel, fluid pressure in a cavity partially formed by a piston plate for a clutch assembly including a reverse clutch and a forward clutch, wherein the reverse clutch and the forward clutch include the piston plate; and,
- displacing the piston plate in response to fluid pressure in the cavity to:
  - controllably connect the reverse stator with a drive hub; and,
  - controllably connect a turbine with the drive hub, wherein controlling fluid pressure in the cavity includes pressurizing the cavity to apply a second force on the piston plate substantially equal to the first force and wherein displacing the piston plate includes displacing the piston plate such that both the forward clutch and the reverse clutch are disengaged.

17. The method of claim 16 wherein displacing the piston plate in response to fluid pressure in the cavity includes balancing force associated with operation of the reverse and forward clutches within the clutch assembly.

18. The method of claim 17 wherein the clutch assembly includes a plate connecting the clutch assembly to the hub and wherein balancing force associated with operation of the reverse and forward clutches within the clutch assembly includes displacing one or both of the piston plate or the plate.

19. The method of claim 16 wherein the torque converter includes a clutch rotationally connected to a turbine in the torus and a ground and in fluid communication with the cavity and the torus and a one-way clutch rotationally connected to the forward stator and the ground and in fluid communication with the cavity and the torus, the method including displacing the clutch and the one-way clutch such that the clutch is disengaged to enable rotation of the turbine, the one-way clutch is engaged or disengaged, and the reverse stator is rotatable in a reverse direction and in a forward direction, opposite the reverse direction.

20. The method of claim 19 wherein the clutch and the one-way clutch are respective slipper clutches.

21. The method of claim 19 wherein the clutch is a first friction clutch and the method further comprising controlling grounding of the one-way clutch with a second friction clutch.

22. The method of claim 16 wherein controlling fluid pressure in the cavity includes pressurizing the cavity to apply a second force on the piston plate less than the first force and wherein displacing the piston plate includes displacing the piston plate to engage the forward clutch and disengage the reverse clutch.

23. The method of claim 22 wherein the torque converter includes a clutch rotationally connected to a turbine in the torus and a ground and in fluid communication with the cavity and the torus and a one-way clutch rotationally connected to the forward stator and the ground and in fluid communication with the cavity and the torus, the method including displacing the clutch and the one-way clutch such that the clutch is disengaged to enable rotation of the turbine, the one-way clutch is engaged to rotationally lock the forward stator in a reverse direction, and the reverse stator is rotatable in a reverse direction and in a forward direction, opposite the reverse direction.

24. The method of claim 23 wherein the clutch and the one-way clutch are respective slipper clutches.

25. The method of claim 23 wherein the clutch is a first friction clutch and the method further comprising controlling grounding of the one-way clutch with a second friction clutch.

26. The method of claim 16 wherein controlling fluid pressure in the cavity includes pressurizing the cavity to apply a second force on the piston plate greater than the first force and wherein displacing the piston plate includes displacing the piston plate to disengage the forward clutch and engage the reverse clutch.

27. The method of claim 16 further comprising an impeller shell, a rear cover, and an impeller clutch and the method further comprising operating the impeller clutch to rotationally connect or disconnect the impeller shell with the rear cover.

* * * * *